United States Patent
Bushong

(10) Patent No.: US 8,899,130 B2
(45) Date of Patent: Dec. 2, 2014

(54) VEHICLE PEDAL SYSTEM

(75) Inventor: Randall Bushong, Macomb, MI (US)

(73) Assignee: Autoline Industries Indiana, LLC, Butler, IN (US)

( * ) Notice: Subject to any disclaimer, the term of this patent is extended or adjusted under 35 U.S.C. 154(b) by 582 days.

(21) Appl. No.: 13/170,983

(22) Filed: Jun. 28, 2011

(65) Prior Publication Data

US 2013/0000440 A1   Jan. 3, 2013

(51) Int. Cl.
*G05G 1/32* (2008.04)
*B60T 7/06* (2006.01)
*B60R 21/09* (2006.01)

(52) U.S. Cl.
CPC ............... *B60R 21/09* (2013.01); *B60T 7/065* (2013.01); *G05G 1/32* (2013.01)
USPC ........................................... 74/512; 180/274

(58) Field of Classification Search
USPC ............. 74/512, 513, 560; 180/271, 274, 275
See application file for complete search history.

(56) References Cited

U.S. PATENT DOCUMENTS

| | | | |
|---|---|---|---|
| 3,410,152 A | 11/1968 | Krusemark | |
| 5,848,558 A | 12/1998 | Isono et al. | |
| 6,112,616 A | 9/2000 | Schonlau et al. | |
| 6,178,846 B1 | 1/2001 | Specht et al. | |
| 6,339,971 B1 | 1/2002 | Kato | |
| 6,499,376 B2 | 12/2002 | Thistleton et al. | |
| 6,679,135 B1 | 1/2004 | Faigle et al. | |
| 6,951,152 B2 | 10/2005 | Strole | |
| 7,191,681 B2 | 3/2007 | Sato | |
| 7,383,752 B2 | 6/2008 | Suzuki | |
| 7,415,909 B2 | 8/2008 | Miyoshi et al. | |
| 7,434,648 B2 | 10/2008 | Hayashi | |
| 7,497,144 B2 | 3/2009 | Yoon | |
| 7,516,683 B2 | 4/2009 | Jasseron | |
| 7,568,545 B2 | 8/2009 | Tanigawa et al. | |
| 7,665,565 B2 | 2/2010 | Tokumo et al. | |
| 2001/0027889 A1 | 10/2001 | Thistleton | |
| 2003/0075005 A1 | 4/2003 | Schiel et al. | |
| 2004/0159176 A1 | 8/2004 | Ji | |
| 2004/0211286 A1 | 10/2004 | Schwerdt et al. | |
| 2004/0255714 A1 | 12/2004 | Jagger et al. | |
| 2006/0162481 A1 * | 7/2006 | Sato | 74/512 |
| 2007/0051550 A1 | 3/2007 | Averdiek et al. | |
| 2007/0137398 A1 * | 6/2007 | Tokumo et al. | 74/512 |

FOREIGN PATENT DOCUMENTS

| | | | |
|---|---|---|---|
| DE | 2204628 A1 | 8/1973 | |
| EP | 0827885 A1 | 3/1998 | |
| EP | 9855506 A1 | 12/1999 | |
| EP | 1253051 A1 | 10/2002 | |

(Continued)

OTHER PUBLICATIONS

European Patent Office Search Report dated Oct. 1, 2012.

*Primary Examiner* — Thomas Diaz
(74) *Attorney, Agent, or Firm* — Harness Dickey & Pierce

(57) ABSTRACT

A pedal system or assembly can be provided to allow a driver of an vehicle to operate the vehicle. The pedal assembly can include a portion that will disengage or move to allow at least a foot engaging portion of the pedal system to discontinue movement towards the driver and allow movement of the pedal towards an engine compartment and away from a passenger compartment in the vehicle. The pedal of the pedal assembly, however, can remain engaged to the components that allow for operation of vehicle systems.

19 Claims, 7 Drawing Sheets

(56) References Cited

FOREIGN PATENT DOCUMENTS

| | | | |
|---|---|---|---|
| EP | 1260419 | A1 | 11/2002 |
| EP | 1318051 | A2 | 6/2003 |
| EP | 1371525 | A2 | 12/2003 |
| EP | 1433679 | A1 | 6/2004 |
| EP | 1440857 | A1 | 7/2004 |
| EP | 1475275 | A2 | 11/2004 |
| EP | 1582419 | A2 | 10/2005 |
| EP | 1600344 | A1 | 11/2005 |
| EP | 1787873 | A2 | 5/2007 |
| WO | WO-03062029 | A1 | 7/2003 |

\* cited by examiner

VEHICLE PEDAL SYSTEM

FIELD

The present disclosure is related to pedal systems for automotive vehicles, and particularly to injury mitigation automotive pedal systems.

BACKGROUND

This section provides background information related to the present disclosure which is not necessarily prior art.

A lever arm with a pedal can be provided in a vehicle to allow a driver to operate a throttle to accelerate the vehicle, apply the brake system to decelerate the vehicle, and a clutch to disengage and engage gears. The pedals are engaged by a driver's foot while the driver sits in a seat of the vehicle and are generally placed near a dashwall and/or a floor board of the vehicle. During an automotive collision, the pedals may potentially be forced against a driver's foot due to movement of the driver or movement of the pedals during the collision. During a collision, for example a front or offset collision, the engine compartment may move towards the passenger compartment and cause the pedals to move towards the driver.

SUMMARY

This section provides a general summary of the disclosure, and is not a comprehensive disclosure of its full scope or all of its features.

An automotive vehicle during a collision can protect a driver and occupants of a passenger compartment of an automotive vehicle. During a frontal collision, an engine compartment may move towards the passenger compartment of the vehicle including moving a dashboard or firewall towards the passenger compartment. Components that are interconnected with the dashboard or the firewall can also, therefore, move towards the passenger compartment. It can be selected to allow various components that are attached fixedly to the dashboard or the firewall to absorb energy or move away from the passenger compartment during a frontal collision.

A pedal system or assembly can be provided to allow the driver of an automotive vehicle to operate the automotive vehicle (also referred to as a vehicle or automobile for the following discussion). During a frontal collision of sufficient force the pedal assembly that is fixed to the dash wall or the firewall can move towards the passenger compartment of the automotive vehicle. Accordingly, the pedal assembly can be designed to include a portion that will disengage or move to allow at least a foot engaging portion of the pedal to discontinue movement towards the passenger and/or allow movement of the pedal towards the engine compartment and away from the passenger compartment in the automotive vehicle. As discussed further herein, the pedal lever arm of the pedal assembly, however, can remain engaged to the components that allow for operation of a vehicle system with the pedal (e.g. brake application and clutch system) after the collision.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
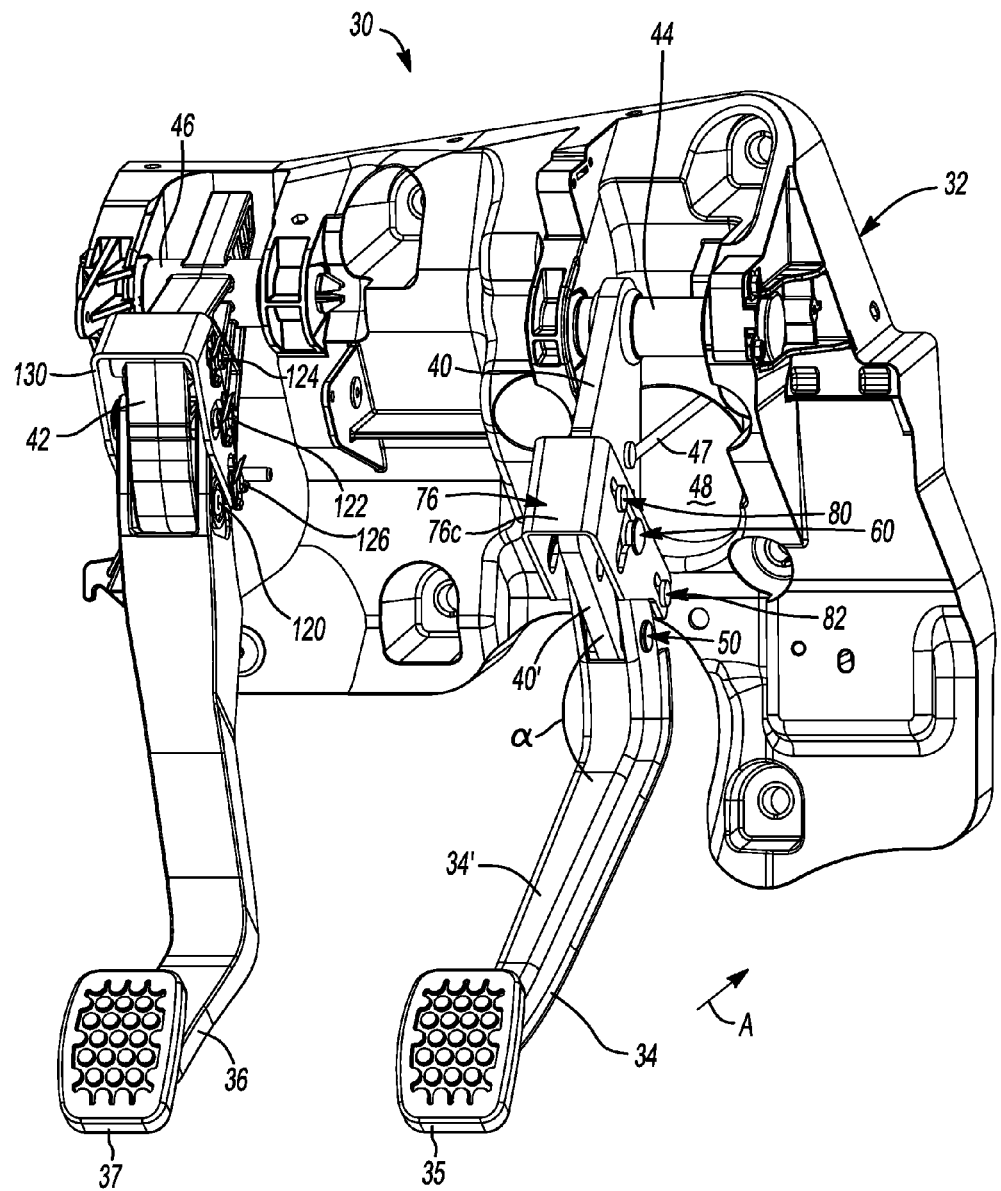
FIG. 2 is a perspective assembled view of a pedal system.
Figure 3A:
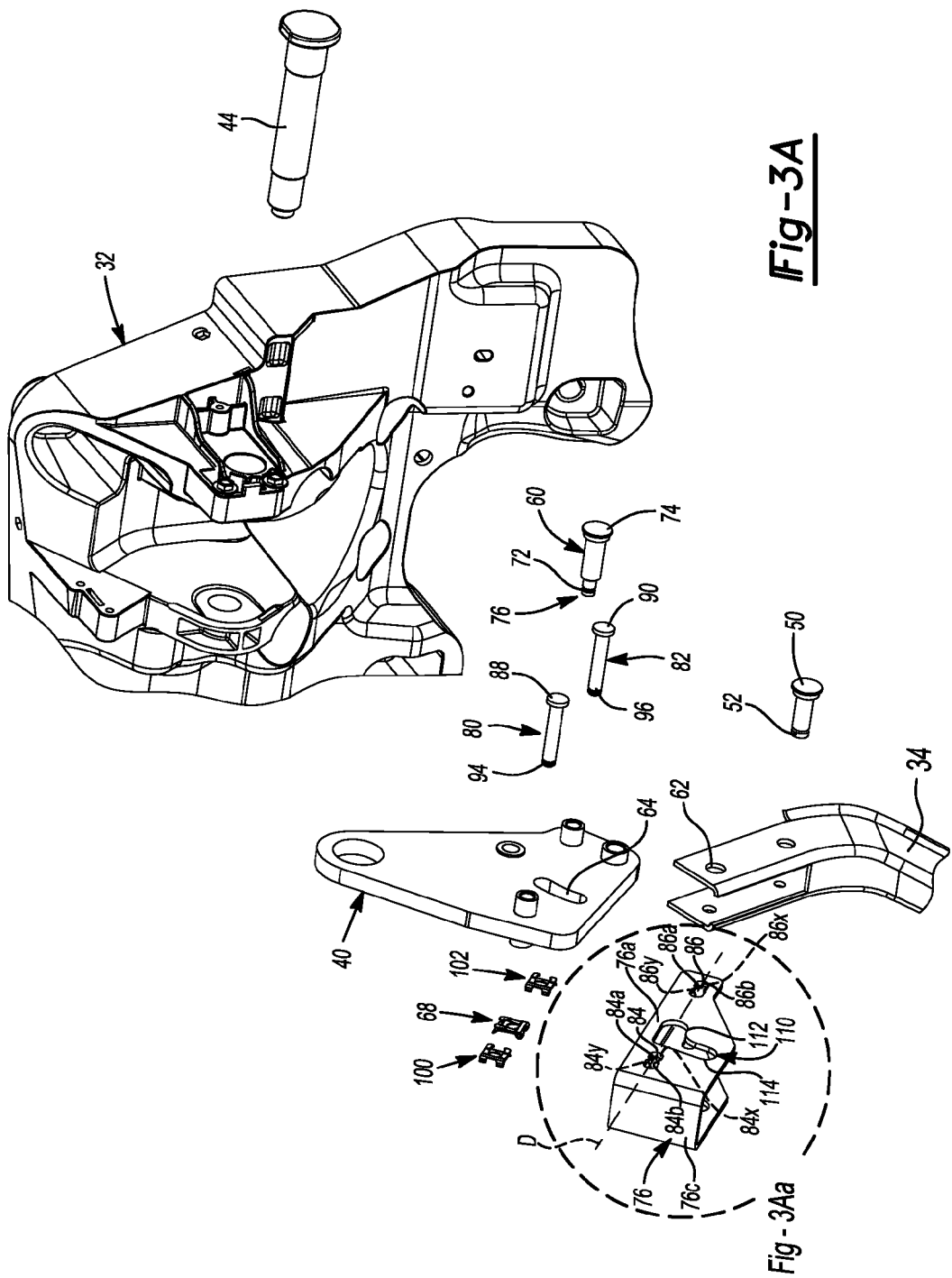
FIG. 3A is a detail exploded first perspective view of the pedal system of FIG. 2.
Figure 3A:
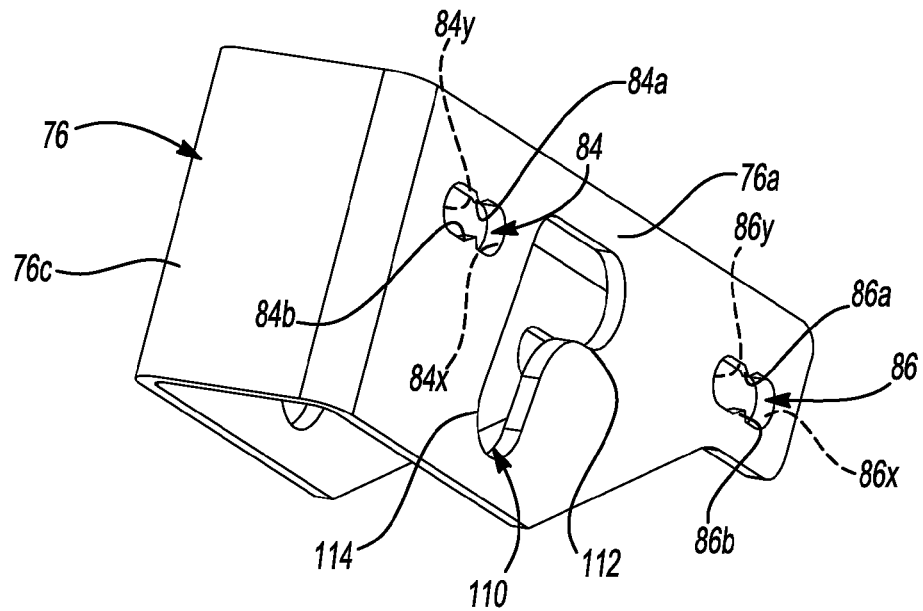
Figure 3B:
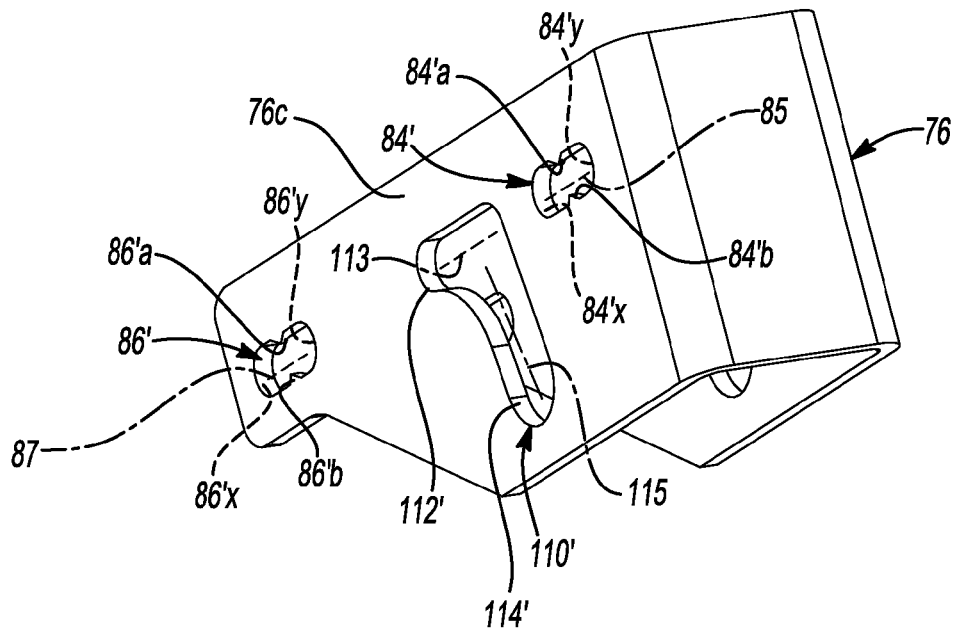
Figure 3B:
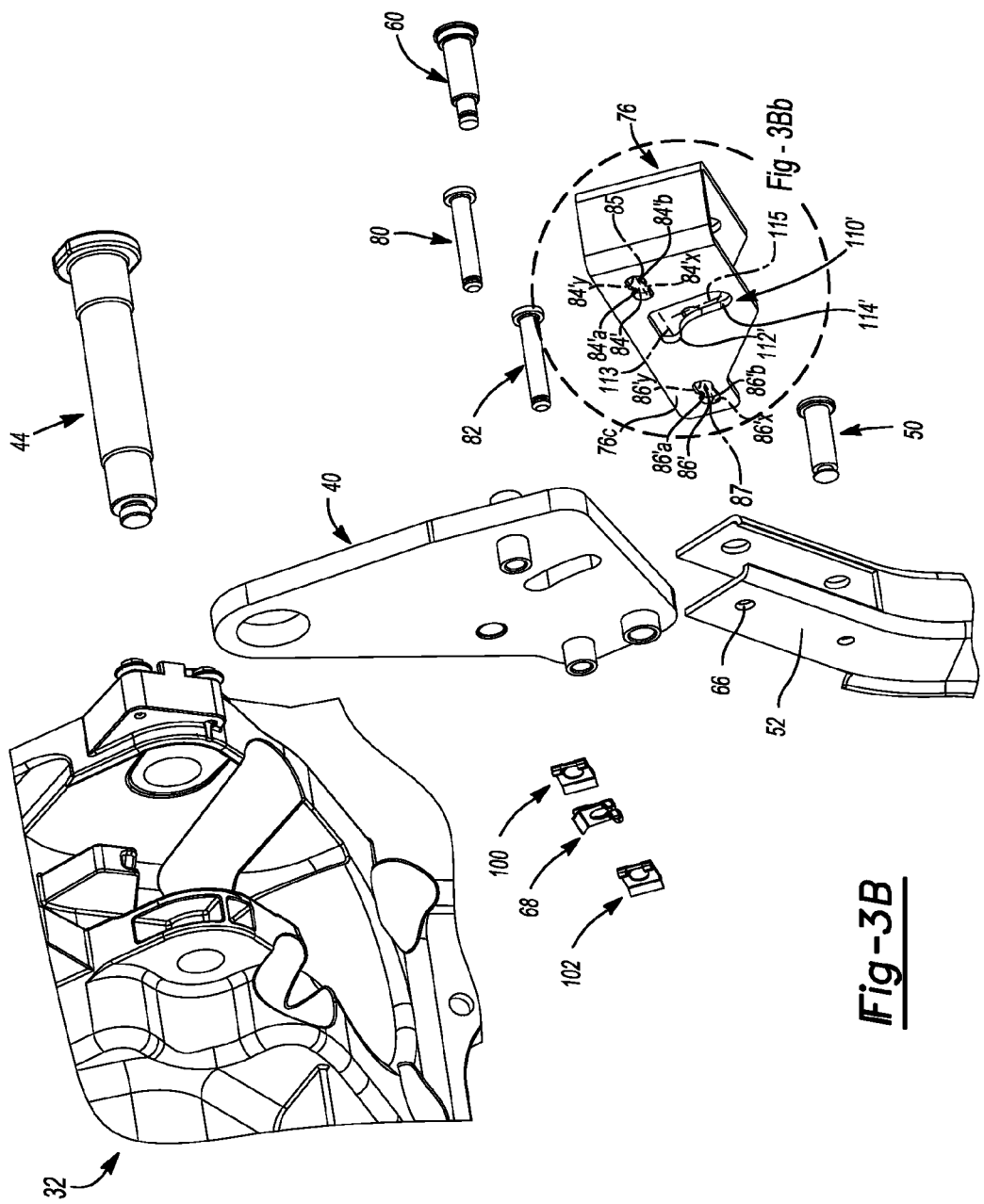
Figure 4:
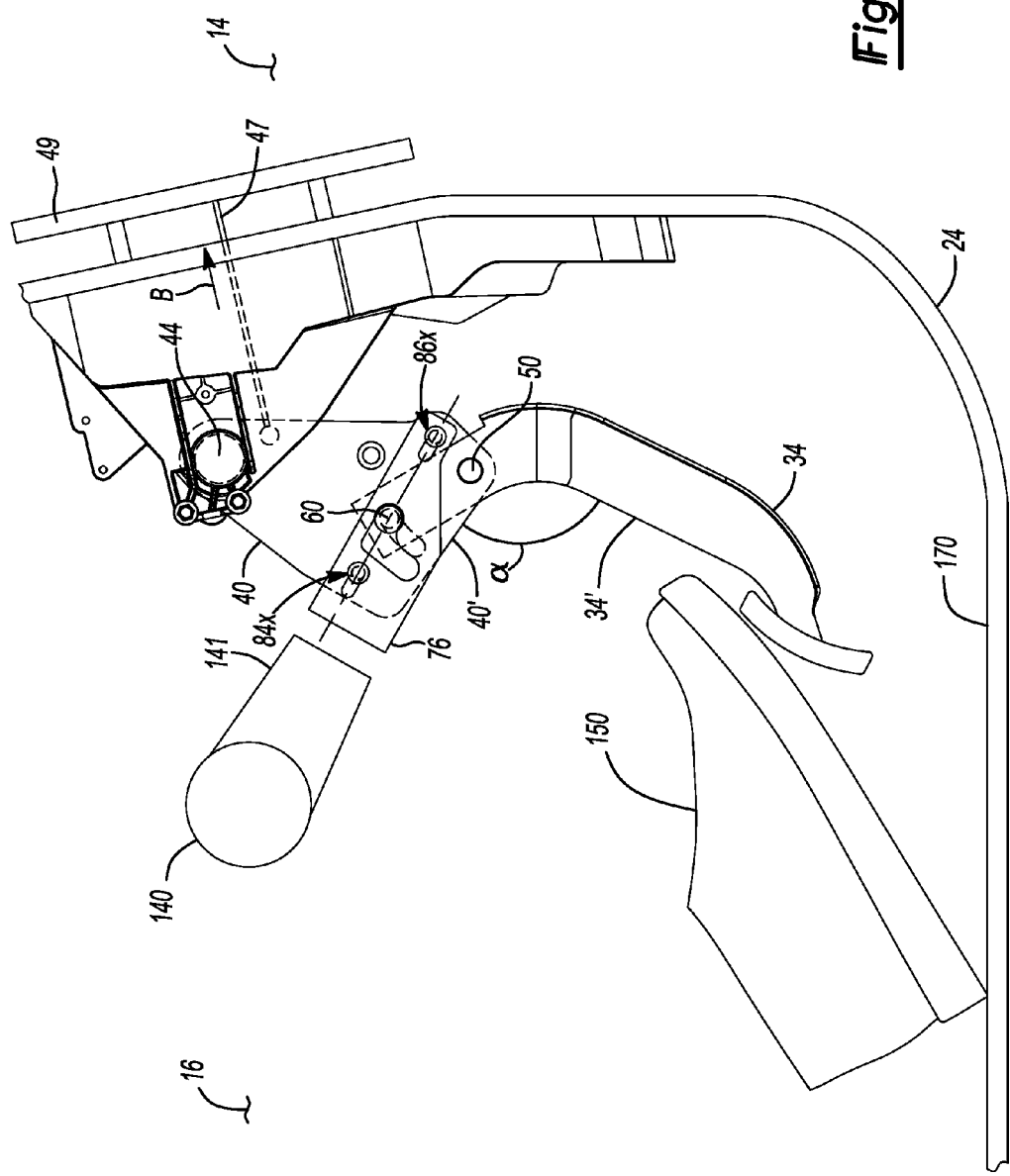
Figure 5:
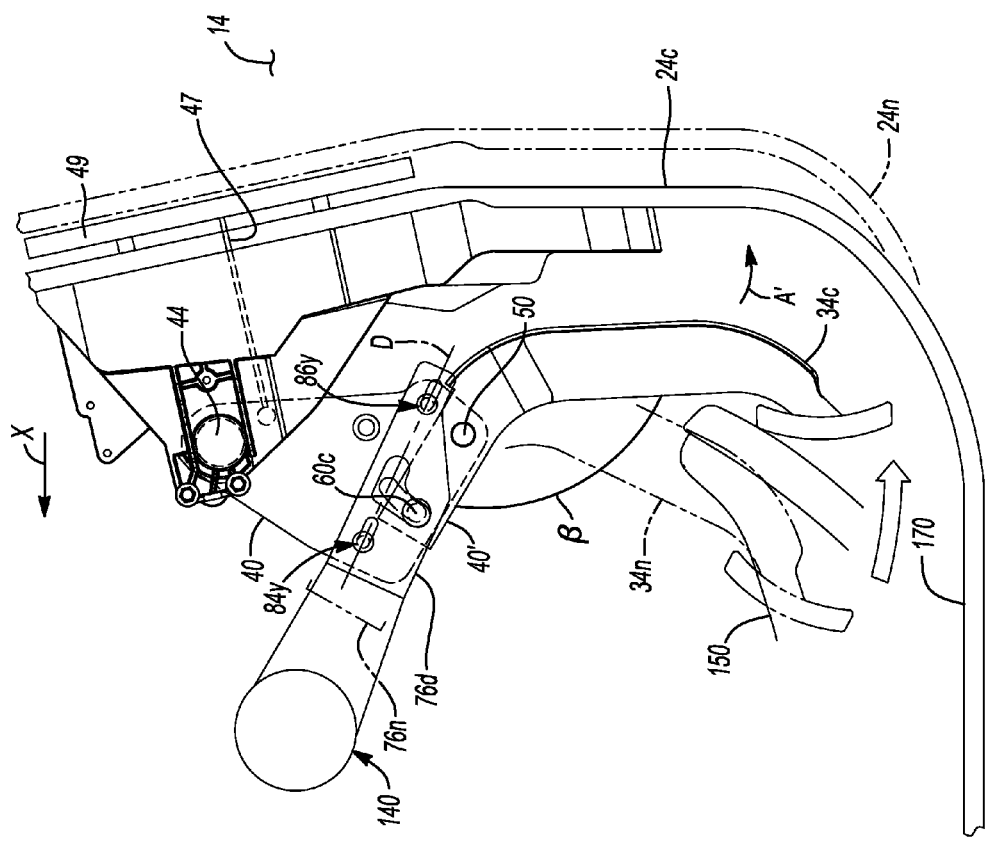

FIG. 3Aa is a detail view of the bracket in circle 3Aa in FIG. 3A;

FIG. 3B is a detail exploded second perspective view of the pedal system of FIG. 2;

FIG. 3Bb is a detail view of the bracket in circle 3Bb in FIG. 3B;

FIG. 4 is a detail environmental view of the pedal system in a normal operating configuration; and FIG. 5 is a detail environmental view of the pedal system in an injury mitigating configuration.

Corresponding reference numerals indicate corresponding parts throughout the several views of the drawings.

DETAILED DESCRIPTION

Example embodiments will now be described more fully with reference to the accompanying drawings.

It will be understood that the following discussion is related to any appropriate vehicle that allows for at least a driver to be positioned within a passenger compartment of an automotive vehicle. Although a passenger vehicle, such as an automotive sedan, is illustrated in the various figures for the following discussion, it is understood that the present teachings may be adapted for use in any appropriate vehicle (e.g. truck or tractor).

Figure 1:
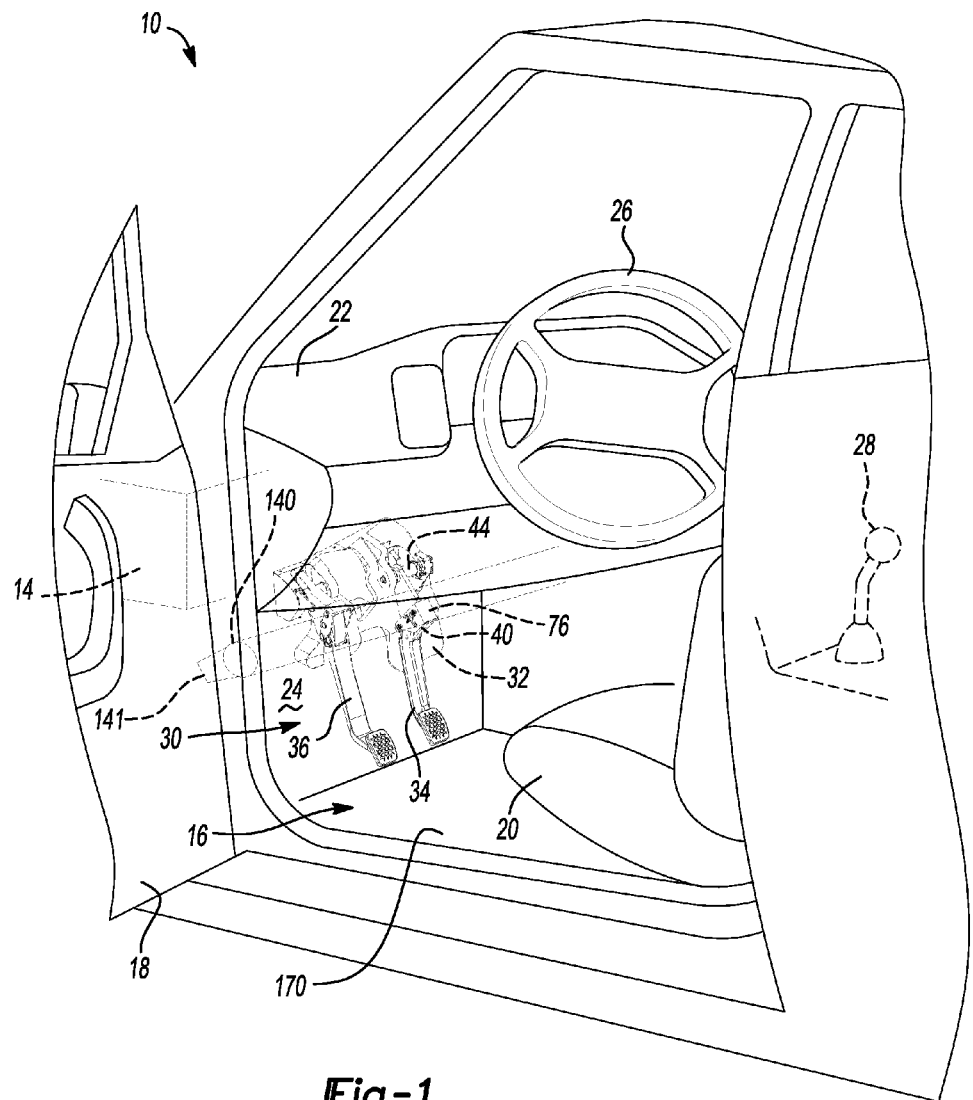
FIG. 1 is an environmental view of a vehicle with a pedal system.

With reference to FIG. 1, a portion of an exemplary automotive vehicle 10 is illustrated to the extent not described herein, it will be understood that the vehicle 10 is conventional in construction. The exemplary automotive vehicle 10 is illustrated to include various components such as an engine compartment area 14, and a passenger compartment 16. It will be understood that various components such as a door 18 can be provided to close the passenger compartment 16, by engaging the frame of the vehicle 10. A seat 20 provides a driver or other appropriate passenger a place to sit while operating the automotive vehicle 10. The automotive vehicle 10 further includes a dash assembly 22 that is connected to a dash wall 24. Extending or interconnect with the dash 22 is a steering wheel 26 and a center console can include a shift lever 28 or other appropriate components.

With continuing reference to FIG. 1 and additional reference to FIG. 2, interconnected with the dash wall 24 can be a pedal assembly 30. The pedal assembly 30 can include various pedal portions such as a pedal bracket mount or construct 32, a brake lever arm 34 including a pedal pad 35 extending from the pedal bracket 32 and a clutch lever arm 36 with a pedal pad 37 extending from the pedal bracket 32. It will be understood that other appropriate pedal levers can be interconnected with the pedal bracket 32, such as an accelerator pedal lever, or other appropriate portions. Also, the pedal levers, for example the brake pedal lever arm 34 and the clutch pedal lever arm 36, can be interconnected with couplers, such as a brake coupler 40 and a clutch coupler 42. The brake coupler 40 and the clutch coupler 42 can rotate on respective axles, including the brake axle 44 and the clutch axle 46 that are fixedly or rotatably connected with the pedal bracket 32. Accordingly, the brake lever arm 34 and the clutch lever arm 36 can be maneuvered to operate portions of the vehicle 10, including a brake system and a clutch system as understood by one skilled in the art.

For example, operation of the brake lever 34 can push a brake push rod 47 that is coupled to the brake coupler 40 through an opening 48 in the pedal bracket 32. The brake rod 47 extends from the brake coupler 40 to a portion of the brake assembly 49 (in FIGS. 4 and 5), including the master cylinder, brake booster, or other appropriate portions of the brake assembly. Clutch portions can also be interconnected with the clutch coupler 42, as is generally understood in the art.

With continuing reference to FIG. 2, and additional reference to FIGS. 3A and 3B, a portion of a brake pedal assembly is illustrated in detail in FIGS. 3A and 3B. As discussed above, the brake lever arm 34 can connect to or be coupled to the brake pedal coupler 40 Various members that couple the brake lever arm 34 and the brake coupler 40 can include bores in connection members, including blind bores and/or through bores (also referred to as passengers.) A first pivot member 50 can include a pin that can pass through a bore at an end of the lever arm 34 and clip or lock to the opposite side of the lever arm 34 at an end 52 of the pivot pin 50 with a clip or with a projection that can be provided to hold the pin 50 in place. The lever arm 34, however, can be fixed in a position relative to the brake coupler 40 through a plurality of other members and/or connections. For example, a second pivot member 60 can be provided to pass through a bore 62 in the brake lever arm 34 and further pass through a mitigation bore 64 in the brake coupler 40 and engage a second bore 66 in the brake lever arm. The mitigation bore 64 can be elongated and extend in an arc, as illustrated in FIGS. 3A and 3B. A clip 68 can engage an end 70 including a groove 72 of the second pivot member 60. The second pivot member 60 can include a head 74 that is enlarged so as to not to pass through the bore 62.

A connection bracket 76 can also be provided to be positioned over the brake lever arm 34 and the brake coupler 40, as illustrated in FIG. 2. The bracket 76 can also be provided so that the member head 74 is external to the bracket 76 as is the clip 68. The construction of the clip 68 can be formed as any appropriate clip to hold the second pivot member 60 in place relative to the brake coupler 40, the connection bracket 76, and the brake lever arm 34. The connection bracket includes a first portion 76a, a second portion 76b, and an abutment wall 76c connecting the first and second portions 76a, 76b. The first and second portions 76a, 76b generally are mirror images of each other and include complementary bores, as discussed herein.

Additionally, a first fixation member (also referred to as a pin) 80 and a second fixation member (also referred to as a pin) 82 can be provided to pass through the bracket 76 in a first fixation bore 84 and a second fixation bore 86, respectively. The two fixation bores 84, 86 can be elongated bores that extend along respective axes 85, 87. The two axes 85, 87 can be aligned and further aligned along an axis D, discussed herein. The first pin 80 can include a head 88 that will not pass through the bore 84 and the second pin 82 can include a head 90 that will not pass through the bore 86.

Further, at least one or both of the first fixation bore 84 and the second fixation bore 86 can include a weakened portion or wall and/or partial walls separating a first fixation section and a second fixation section, as illustrated in FIG. 3A and in detail in FIG. 3Aa. The first fixation bore 84 can include a first partial wall 84a and a second partial wall 84b. The partial walls 84a, 84b define a first section 84x for a normal operation position, as discussed herein, and a second section 84y for a mitigation or avoidance position, as discussed herein. The second fixation bore 86 can include a first partial wall 86a and a second partial wall 86b. The partial walls 86a, 86b define a first section 86x for normal operation position, as discussed herein, and a second section 86y for the mitigation or avoidance position, as discussed herein. Generally, the pins 80, 82 can be held in the respective first sections in a normal operating position of the connection bracket 76. The weakened portion, which can include the partial walls 84a,b and 86a,b, are formed to be frangible or deformable to allow the pins 80, 82 to move after the application of a selected force. The weakened portion, as exemplary discussed herein, need not, but may, form a complete wall between the respective first sections and the second sections, but enough to resist or eliminate movement of the pins 80, 82, in normal operation, from the first sections to the second sections.

On the counter side or opposite of the coupler 40 and the connection bracket 76, a second pair of bores 84' and 86' can allow a first passing end 94 of the first pin 80 and a second passing end 96 of the second pin 82 to pass. Clips 100 and 102 can engage grooves in the first pin 80 and the second pin 82 to hold them in place after they have passed through the bracket 76.

The second pair of bores 84' and 86' can also include a weakened portion, including partial or complete walls, as illustrated in FIG. 3B and in detail in FIG. 3Bb. The counter first fixation bore 84' can include a first partial wall 84'a and a second partial wall 84'b. The partial walls 84'a, 84'b define a first section 84'x for a normal operation position, as discussed herein, and a second section 84'y for a mitigation or avoidance position, as discussed herein. The counter second fixation bore 86' can include a first partial wall 86'a and a second partial wall 86'b. The partial walls 86'a, 86'b define a first section 86'x for the normal operation position, as discussed herein, and a second section 86'y for the mitigation or avoidance position, as discussed herein. Generally, the pins 80, 82 can be held in the respective first sections in a normal operating position of the connection bracket 76. The weakened portion, which can include the partial walls 84'a,b and 86'a,b, are formed to be frangible or deformable to allow the pins 80, 82 to move after the application of a selected force. The weakened portion, as exemplary discussed herein, need not, but may, form a complete wall between the respective first sections and the second sections, but enough to resist or eliminate movement of the pins 80, 82, in normal operation, from the first sections to the second sections.

The connection bracket 76 includes the first and second passages 84 and 86, in the respective portion 76a, 76b, to allow passage of the first and second fixation pins 80, 82. Connection bracket mitigation bores or slots 110 and 110' are provided on the two portions 76a, 76b of the bracket 76 as well, as illustrated. The second pivot pin 60 passes through the connection bracket mitigation slot 110, 110' to allow movement of the brake lever arm 34 to a mitigation position, as discussed further herein. Generally, the mitigation slot 110, 110' includes a first portion or section 112 and 112' and a second portion or section 114 and 114', on respective sides of the connection bracket 76, as illustrated. The first portion 112, 112' can be standard or operating or normal operating position of the second pivot pin 60 and extend along a first axis 113, as illustrated in FIG. 2. As discussed further herein, however, upon impact or application of a selected force on the connection bracket 76, the connection bracket 76 can move to a second or mitigation position, the second pivot pin 60 can move to the second portion 114. The second portion 114, 114' extends along a second axis 115. The second axis 115 is at a non-zero angle relative to the first axis 113. The second pivot pin 60 can move in the slot 64 defined in the brake coupler 40 to allow the brake lever arm 34 to move generally in the direction of Arrow A towards and/or in contact with the dashwall 24 (the bracket 32 can be mounted at or near the dashwall 24). Movement of the second pivot pin 60 can be allowed when the connection bracket 76 moves upon the imposition of a force onto the connection bracket 76, discussed herein.

Briefly, clutch lever arm 36 can be connected to the clutch coupler 42 via first and second pivot pins 120 and 122 and first and second fixation pins 124 and 126. A connection bracket 130 can also be provided over the clutch lever arm 36 and the clutch coupler 42 through which the pivot pins 120 and 122 and fixation pins 124 and 126 will pass. Clips can also be used to hold the respective pins in place, similar to the clips 68, 100, and 102 for the brake assembly. The clutch assembly including the clutch lever arm 36, the clutch coupler 42, and the clutch connection bracket 130 can operate in a manner similar to the brake assembly described herein. Accordingly, further detail regarding the clutch assembly is not provided here as it is understood that the assembly will operate substantially similarly to the brake assembly discussed further herein, particularly in connection with a collision and injury mitigation.

Returning reference to FIG. 1 and additional reference to FIG. 4, the vehicle 10 can include various structures that are interconnected with one another. For example, the vehicle 10 generally includes a frame assembly that is structurally reinforced at various positions. For example, a car cross beam 140 can be positioned to interconnect with various frame components of the vehicle 10. The car cross beam 140 can be positioned relative to the connection brackets 76, 130 of the pedal assembly 30. The car cross beam 140 can also include various other brackets 141 or connections that extend from the car cross beam 140 to engage the connection brackets 76, 130 of the pedal assembly. Regardless, the car cross beam 140 can be positioned in a substantially linear position relative to the axis 113 of the first slot section 112 and the axes 85 and 87 of the fixation slots and towards the passenger compartment 16 of the vehicle 10 and rearward of the engine compartment 14 of the vehicle 10.

In normal operation and when the connection bracket 76 is in a selected operating position, as illustrated in FIG. 4, the car cross beam 140 is positioned a distance away from the pedal assembly 30, including the brake coupler 40, the brake lever arm 34 and the brake connection bracket 76. The brake lever arm 34 can be operated with a foot 150 of a user or passenger that is seated in the seat 20 in the passenger compartment 16. By pressing the brake pedal 35, generally towards the dash wall 24 in the direction of arrow A', the brake lever arm 34 rotates the brake coupler 40 on the pivot axle 44 to push the brake rod 47 towards the engine compartment 14 in the direction of arrow B. The rotation of the brake coupler 40 around the axle 44 produced by pressing on the brake lever arm 34 allows for the actuation of the brake system of the vehicle 10. The user's foot 150 can press on the brake lever arm 34 in an appropriate amount, as generally understood by one skilled in the art.

The fixation of the two pivot pins 50 and 60 and the fixation pins 80 and 82 to the brake coupler 40 via the connection bracket 76 ensure a normal operation geometry of the brake lever arm 34 and the brake coupler 40 is maintained during normal operation of the brake assembly. Maintaining the normal geometry of the brake lever arm 34 relative to the brake coupler 40 is allowed because the second pivot pin 60 that engages the bore 62 in the lever arm 34 and the mitigation bore 64 in the brake coupler 40. The pin 60 is not able to move along the length of the mitigation bore 64 in the brake coupler 40 due to the connection bracket 76. The connection bracket 76 is fixed relative to the brake coupler 40, this holds the second pivot pin 60 within the first portion 112 of the mitigation bore 110 such that the lever arm 34 is maintained in a single orientation relative to the brake coupler 40. The fixation pins 80 and 82 fix the connection bracket 76 relative to the brake coupler 40.

As illustrated in FIG. 5, however, during a frontal or offset collision, an impact occurs near or into the engine compartment 14 of the vehicle 10. The dash wall 24 including the pedal assembly 30 can then move towards the passenger compartment 16 generally in the direction of arrow X, as illustrated in FIG. 5. As the dash wall 24 moves towards the passenger compartment 16 and portions of the engine compartment 14 also move towards the passenger compartment 16, the pedal assembly 30 moves towards the passenger compartment 16 and the user's foot 150. As illustrated, the dashwall 24 can move the a normal position 24n to a collision position 24x that is closer to the passenger compartment than originally constructed.

In addition to the pedal assembly 30 moving towards the passenger compartment 16, various portions that are connected to the pedal assembly 30 can also move towards the passenger compartment, such as the brake push rod 47 and the brake lever arm 34. The movement of the pedal assembly 30 and portions connected therewith towards the passenger compartment 16 may apply forces to the user, such as the user's foot 150, that are desired to be lessened or mitigated.

As illustrated in FIG. 5, as the brake assembly 30 moves towards the passenger compartment 16, the connection bracket 76 can engage the car cross beam 140 or the bracket 141 extending from the car cross beam 140. Upon engagement with the beam 140, the connection bracket 76 moves relative to the brake coupler 40 from the normal or first position to a collision or mitigation position. Movement of the connection bracket 76 can cause the fixation pins 80, 82 to engage and break through the weakened portions, as discussed above including the partial walls 84a,b; 84'a,b; 86a,b; and 86'a,b (e.g. illustrated in FIGS. 3A and 3B) of the fixation bores 84, 86 and move to the respective second portions upon the application of a collision impact or other selected force.

Upon the application of the selected force, the connection bracket 76 can move substantially linearly along an axis D generally defined through the first bore 84 and the second bore 86. The axis D can also pass through the first portion 112 of the mitigation slot 110 of the connection bracket 76. Generally, the axis D may be aligned with the axes 85, 87 and 113 of the respective bores or bore portions. Thus, the connection bracket 76 may move from a normal position 76n (shown in phantom) to a collision position 76d (shown in solid). The movement of the connection bracket 76 is due to impingement with the car cross beam 140 and/or the bracket 141.

As the connection bracket 76 moves along the axis D, the second pivot pin 60 can move into the second portion 114 of the mitigation bore 110 of the connection bracket 76. As the middle or second pivot pin 60 moves into the second portion 114 of the mitigation bore 110, the second pivot pin 60 can move along the length of the mitigation bore 64 in the brake coupler 40 to allow the brake lever arm 34 to move towards the dashwall 24 (where the dashwall 24 can at least partially separate the engine compartment 14 from the passenger compartment 16) generally in the direction of arrow A', as illustrated in FIG. 5, to a collision or mitigation position 34c from the normal position 34n. The brake lever arm 34 is able to move in the direction of A' towards the dashwall 24 to change its geometric configuration relative to the brake coupler 40, as illustrated in FIG. 5.

Returning reference to FIG. 4, in the normal position 34n an initial or normal angle or geometry between a first portion or surface 34' of the lever arm 34 and a second surface 40' of the brake coupler 40 can include an angle $\alpha$. The angle $\alpha$ can be any appropriate angle and can be selected based upon a geometry of a particular vehicle, passenger specifications (e.g. height), etc. An exemplary angle $\alpha$ can include about 100 degrees to about 170 degrees. In the normal operating position, the angle α can be maintained due to the fixation of the various pins 50, 60, 80 and 82 in the connection bracket 76. However, during the crash mitigation phase, the mitigation position 34c can cause an angle between the surface 34' of the lever arm 34 and the surface 40' of the brake coupler 40 can be increase from the angle α to an angle β that as the brake lever arm 34 moves towards the engine compartment 14 relative to the brake coupler 40. The angle β can also be selected based on a geometry of a vehicle, passenger requirements or other considerations. For example, the angle β can be about 110 degrees to about 250 degrees. Generally, the angle β is at least 5% to 500%, including about 10% to about 50% greater than the angle α. This allows a greater area for the passenger's foot 150 to be positioned within the passenger compartment 16 to diminish or eliminate impact of the pedal lever arm 34 with the user's foot 150. This may prevent or reduce the impact applied to the user's foot 150 during a frontal collision of the vehicle 10.

Although the movement of the brake pedal lever arm 34 towards the dashwall 24 can be allowed due to movement of the second pivot pin 60 within the slot 64 defined by the brake coupler 40, as discussed above, the first and second pivot pins 50 and 60 maintain a coupling between the brake lever arm 34 and the brake coupler 40, as illustrated in FIG. 5. Accordingly, even following a collision, the brake lever arm 34 is interconnected with the brake coupler 40 in a manner that allows the brake lever arm 34 to move the brake coupler 40 that is connected to the brake push rod 47. Only the second pivot pin 60 moves into the second section 114 of the bore 110 in the connection bracket 76, while the connection bracket 76 remains coupled to the coupler 40. It will be understood that the distance of travel between the brake lever arm 34 and the dash wall 24 or a floor board 170 of the vehicle 10 may be reduced, however, the brake lever arm 34 may be manipulated to move the brake coupler 40 to operate the brake push rod 47 to operate the braking system of the vehicle 10.

As discussed above, the clutch lever arm 36 is connected with the clutch coupler 42 in a manner similar to the connection of the brake lever arm 34 and the brake coupler 40. Accordingly, the clutch lever arm 36 and the clutch coupler 42 can be operated in a normal operating position. During a collision, the clutch connection bracket 130 can also contact the cross car beam 140 similar to the brake connection bracket 76. Accordingly, the brake connection bracket 76 and the clutch connection bracket 130 can operate similarly to allow movement of the respective lever arms 34, 36 towards the dashwall 24 during a frontal or offset collision. However, similar to the operation of the brake lever arm 34 after the frontal collision, the clutch lever arm 36 is also connected to the clutch coupler 42 in a manner similar to the brake lever arm 34 to allow for operation of the clutch, although possibly in a limited manner, after a frontal collision.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pedal system for a vehicle, comprising:
a pedal assembly bracket;
a pedal lever arm operable to be engaged by a portion of a user;
a coupler operable to rotate around a member extending from the pedal assembly bracket, the coupler having a first sidewall and a second sidewall and a mitigation slot formed through the first sidewall and the second sidewall;
a connection bracket having a first side portion and a second side portion, the first side portion having a first fixation passage and a first pivot passage with a first pivot passage portion and a second pivot passage portion and the second side portion having a second fixation passage and a second pivot passage with a third pivot passage portion and a fourth pivot passage portion;
a first pivot member coupling the pedal lever arm, the coupler, and the connection bracket via the first pivot passage portion and the second pivot passage portion by extending through the pedal lever arm and the mitigation slot in the coupler; and
a first fixation member coupling the coupler and the connection bracket via the first fixation passage and the second fixation passage;
wherein the connection bracket is moveable from a first connection bracket position to a second connection bracket position;
wherein the pedal lever arm is operable to transfer a force to the coupler;
wherein the first fixation passage defines an elongated slot extending along a fixation axis;
wherein the elongated slot defines a linear path of movement of the connection bracket from a first connection bracket position to a second connection bracket position.

2. The pedal system of claim 1, wherein the first pivot passage portion extends along a first pivot passage axis and the second pivot passage portion extends along a second pivot passage axis;
wherein the first pivot passage axis extends at a non-zero angle relative to the second pivot passage axis.

3. The pedal system of claim 1, wherein the first fixation passage extends along a first fixation passage axis and the second fixation passage extends along a second fixation passage axis;
wherein the first fixation passage axis and the second fixation passage axis are substantially parallel.

4. The pedal system of claim 1, wherein the first side portion and the second side portion of the connection bracket are connected with an abutment wall;
wherein the abutment wall is operable to engage a support member of the vehicle and move the connection member from the first connection bracket position to the second connection bracket position.

5. The pedal system of claim 1, further comprising:
a second pivot member coupling the pedal lever arm and the coupler;
wherein the second pivot member is operable with the first pivot member to maintain operation of the pedal system when the connection bracket is in the second connection bracket position.

6. The pedal system of claim 1, further comprising:
a second fixation member coupling the coupler and the connection bracket, the;
wherein the first fixation member and the second fixation member support the connection bracket in the first connection bracket position.

7. A pedal system for a vehicle, comprising:
a pedal lever arm operable to be engaged by a portion of a user;
a coupler operable to rotate around an axle coupled to the vehicle, wherein the pedal lever arm is coupled to the coupler, wherein the coupler defines a first mitigation slot formed in the coupler;
a connection bracket having a first side portion and an end portion, wherein the first side portion defines a second mitigation slot having a first slot section a distance from a second slot section; and
a first pivot pin coupling the pedal lever arm, the coupler, and the connection bracket by extending at least between the first mitigation slot and the second mitigation slot, the first pivot pin is operable to move from the first slot section to the second slot section; the first pivot pin is moveable from the first slot section to the second slot section when the connection bracket is moved from a first bracket position to a second bracket position;
wherein the pedal lever arm is operable to transfer a force to the coupler;
wherein the connection bracket defines an elongated fixation bore having a weakened portion at least partially separating a first fixation bore section and a second fixation bore section.

8. The pedal system of claim 7, further comprising:
a first fixation pin that extends through a first fixation passage in the connection bracket, and a second fixation passage in the coupler;
wherein the first fixation pin holds the connection bracket in the first bracket position.

9. The pedal system of claim 8, wherein the first fixation passage defines an elongated slot extending along a fixation axis;
wherein the elongated slot defines a linear path of movement of the connection bracket from the first bracket position to the second bracket position.

10. The pedal system of claim 9, wherein the first slot section extends along a first slot axis and the second slot section extends along a second slot axis;
wherein the first slot axis defines a non-zero angle relative to the second slot axis.

11. The pedal system of Claim 10, wherein the second slot axis extends towards a floor board of the vehicle to allow the pedal lever arm to move towards the floor board when the first pivot pin moves into the second slot section.

12. The pedal system of claim 10, further comprising:
the axle member connected to a pedal bracket assembly;
wherein the coupler is operable to rotate around the axle member.

13. The pedal system of claim 12, wherein the second bracket position is closer to the axle member than the first bracket position.

14. The pedal system of claim 7, wherein the pedal lever arm includes a first pedal lever arm and a second pedal lever arm;
wherein the coupler includes a first coupler and a second coupler, wherein the first coupler is coupled to the first pedal lever arm and the second coupler is coupled to the second pedal lever arm, and further wherein the first coupler and the second coupler are moveable independently of each other;
wherein the connection bracket includes a first connection bracket and a second connection bracket, wherein the first connection bracket is coupled to the first pedal lever arm and the second connection bracket is coupled to the second pedal lever arm.

15. A method of forming a pedal assembly for use in a vehicle, comprising:
providing a connection bracket with a mitigation slot having a first slot section and a second slot section;
providing a pedal assembly having a pedal lever arm and a coupler coupled together in a first fixed position at least by a first pivot member passing through the mitigation slot in the connection bracket to connect the pedal lever arm and the coupler; and
configuring the pedal assembly to be fixed in the vehicle between a forward compartment of the vehicle and a support member of the vehicle, such that when the forward compartment moves towards the support member the pedal assembly moves to a second position towards the support member and the connection bracket engages the support member to move towards the forward compartment;
configuring a fixation slot in the connection bracket to include a weakened portion, wherein a fixation pin moves past the weakened portion when the connection bracket moves towards the forward compartment;
wherein when the connection bracket moves towards the forward compartment the first pivot member moves from the first slot section in the first fixed position to the second slot section and moves the pedal lever arm towards the forward compartment.

16. The method of claim 15, further comprising:
configuring the connection bracket to maintain the first pivot member within the connection bracket after the connection bracket completes movement towards the forward compartment to the second position.

17. The method of claim 16, further comprising:
configuring at least one of the pedal lever arm or the coupler to connect to and operate a system of the vehicle; and
configuring the connection to be at least partially maintained such that the system of the vehicle is operable after the first pivot member moves to the second slot section.

18. The method of claim 16, wherein the first pivot member moves within a second mitigation slot within the coupler when the connection bracket moves towards the forward compartment.

19. The method of claim 15, further comprising:
configuring the fixation slot to extend along a fixation axis wherein the fixation slot forms a linear path of movement of the connection bracket from a first bracket position to a second bracket position.

* * * * *